Oct. 24, 1972     R. L. COOK     3,700,534
HARD FACED PLASTIC ARMORPLATE
Original Filed March 28, 1963
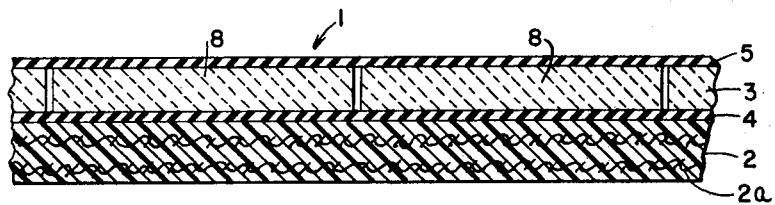
FIG.-1
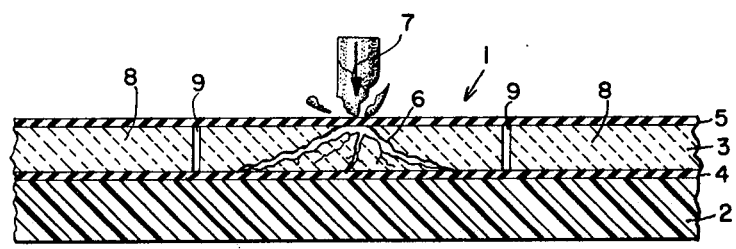
FIG.-2
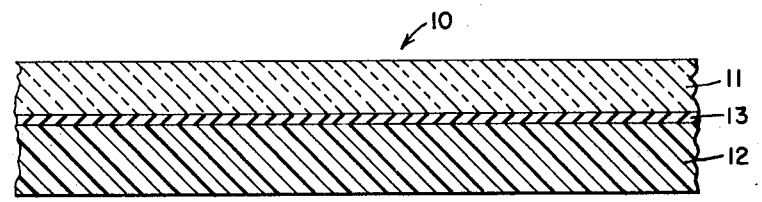
FIG.-3
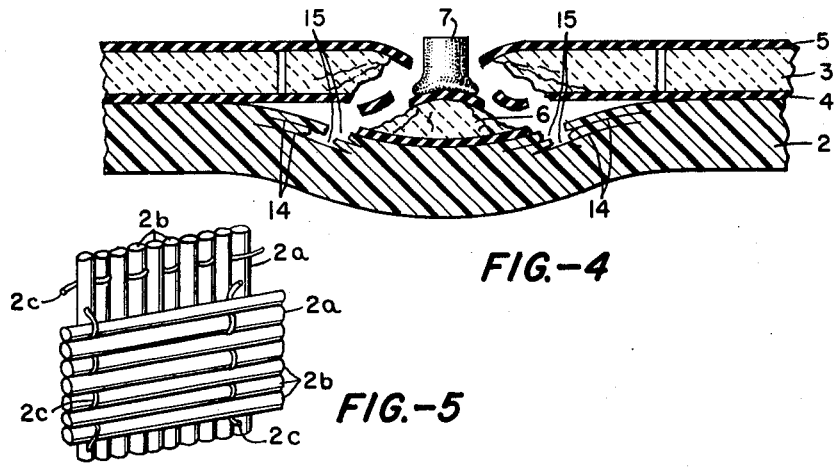
FIG.-4
FIG.-5

United States Patent Office 3,700,534
Patented Oct. 24, 1972

3,700,534
HARD FACED PLASTIC ARMORPLATE
Richard L. Cook, Phoenix, Ariz., assignor to Goodyear Aircraft Corporation, Akron, Ohio
Original application Mar. 28, 1963, Ser. No. 268,765, now Patent No. 3,509,833, dated May 5, 1970. Divided and this application May 1, 1970, Ser. No. 33,952
Int. Cl. A41d 3/04; B35b 3/10
U.S. Cl. 161—38      3 Claims

ABSTRACT OF THE DISCLOSURE

Armorplate comprising a relatively thick base of transparent stretched methyl methacrylate and a relatively thick facing layer of transparent window glass is secured to the base by a relatively thin layer of methyl methacrylate cement.

---

This invention relates to hard faced plastic armorplate laminate, and, more particularly, to a laminate structure which can be either clear or opaque, and which is highly resistant to armor piercing type of bullets.

This is a division of my prior patent application Ser. No. 268,765, filed Mar. 28, 1963, now Pat. No. 3,509,833 granted May 5, 1970.

Heretofore it has been known that there are many and varied ways to create armored plate. However, this armored plate has usually been metal, which has been heavy and expensive. There has been attempts to create transparent bullet resisting armored plates, but these plates have also had to be extremely thick and heavy as well as expensive, and have not proved practical or durable for use in military warfare, or more particularly for use in aircraft where lightness of weight is an essential criteria.

It is the general object of the invention to avoid and overcome the foregoing and other difficulties of and objections to prior art practices by the provisions of a hard faced plastic armorplate laminate structure which is highly effective to bullet resistance, extremely light in weight and easy to handle, and which is also relatively low in cost.

Another object of the invention is the provision of an armorplate made of ceramic and plastic wherein the ceramic is positioned to shatter or, by fusion and melting to dissipate the bullet and to then carry the load of impact into a resilient backing, thereby distributing the force of the bullet over a large diameter on the final load carrying plastic layer.

Another object of the invention is to provide a light weight, effective shaped charge resistant plastic laminate utilizing the principle of a brittle outer layer which, by breaking up in a conical pattern tends to dissipate the jet blast of a shaped charge in combination with the low thermal conductivity and high heat of ablation properties of a plastic backing layer.

Another object of the invention is to provide a plastic laminate armorplate utilizing a very hard aluminum oxide as an outer layer with the layer segmented into tiles so that the concentrated energy of a projectile can be locally absorbed without fracture and loss of the surrounding facings, the substrata layer being bonded to the aluminum oxide layer by a flexible bonding agent capable of retaining the tile under severe impact deformation.

Another object of the invention is to provide a laminate of the type set forth in which the substrata yields and delaminates to absorb force during bullet penetration.

The aforesaid objects of the invention, and other objects which will become apparent as the description proceeds, are achieved by providing a laminate structure resistant to either a solid steel core projectile or a shaped charge projectile and including the combination of a facing layer made from an extremely hard material, a reinforced plastic substrata layer, flexible bonding means between the facing layer and the substrata layer, the facing layer being segmented into sections so that the concentrated energy of the projectile can be locally absorbed without fracture and loss of the surrounding facing, the facing layer having the tendency to shatter in an expanding conical shape inwardly from the impact point of the bullet, the substrata layer having low thermal conductivity and high heat ablation properties, and the substrata having high resilience and high impact resistance.

For a better understanding of the invention reference should be had to the accompanying drawings, wherein:

FIG. 1 is a fragmentary cross sectional view of a laminate structure comprising one embodiment of the invention;

FIG. 2 is a fragmentary cross sectional view of the laminate structure of FIG. 1 showing a projectile just after striking the outer layer of the laminate and the fragmentation that results therefrom;

FIG. 3 is a fragmentary cross sectional view of a transparent form of the plastic laminate armorplate comprising the invention;

FIG. 4 is a view similar to FIG. 2 but illustrating the farther penetration of the projectile; and FIG. 5 is an enlarged fragmentary perspective view of the reinforced substrata layer of the laminate.

With specific reference to the form of the invention illustrated in FIGS. 1 and 2 of the drawings, the numeral 1 indicates generally a plastic laminate armorplate comprising a plastic substrata layer 2 reinforced with glass fabric 2a, an extremely hard surface layer 3, and with the layers 2 and 3 being bonded together by a flexible bonding agent 4. In order to prevent spalling or flaking of the outer layer 3 upon projectile impact, a thin flexible rubberized layer or sheet 5 is preferably provided over the outer layer 3. The sheet 5 may also be of ballistic nylon cloth or felt or resin impregnated glass fabric to further prevent fragmentation of ceramic layer 3.

The first principle of the invention is that the outer layer 3 must be of an extremely hard material in order to blunt, melt or shatter the oncoming projectiles. After extensive testing, it was found that a material such as aluminum oxide or an alumina tile or alumina ceramic proved to have the lightweight characterics desired, yet provided the extremely hard surface necessary to achieve the blunting or shattering of the projectiles upon impact. Preferably a ceramic having a high alumina content is employed, for example 85% or more, and preferably over 90%. Excellent results have been obtained with an alumina content of 94%. The alumina ceramics have a weight advantage of approximately 2 to 1 over aluminum armor, as well as providing better armor piercing protection. Through extensive testing, it was found that a thickness of the layer 3 between ¼ inch to ⅜ of an inch, and in the combination above described, provided adequate armor piercing protection for 30.06 armor piercing ammunition at 5 yard shooting range and 0 degree obliquity. Armor protection of this type is desired for aircraft and helicopter protection against ground troop fire. Comparing the alumina ceramic faced and plastic body reinforced armorplate of the present invention with steel shows a weight penetration advantage for the alumina ceramic over steel of about 4 to 1.

It is to be particularly noted, with respect to FIG. 2, that the ceramic layer 3 tends to fracture in an expanding conical shape, indicated generally by the numeral 6, from the point of impact created by the projectile 7. The angle of conical fracture is believed to correspond to the shock wave sent ahead of the projectile. The conical expansion 6 of the impact area greatly distributes the rather small and compact impact force of the projectile 7 over a much larger area onto the substrata layer 2. Also, it was found to be advantageous to form the layer 3 in a plurality of smaller tiles indicated at 8, which tend to localize the shattering, and which sections can be easily replaced to make the armor laminate plate usable for a long service life, even after it has absorbed the impact of many projectiles. During testing it was found that if a projectile 7 impacted upon the gaps 9 between tiles 8, that the armor protection properties were just as good as if the projectile 7 hit towards the center of a tile, as indicated in FIG. 2.

The second principle of the armor laminate plate construction is based on the low thermal conductivity and high heat of ablation of plastics, plus the resilience and high impact resistance of the reinforced plastic substrata layer 2, and its force absorbing action by delaminating upon bullet impact. Having reference to FIG. 5 the layer 2 is made up of a plurality of layers 2a of glass fabric, each layer formed of straight warp cords 2b or filaments as shown in the range of more than three and up to ten times as strong as the undulating weft cords 2c. The layers 2a are usually laid alternately in direction, but more than one layer can be in the same direction, and are built up with a low content of resin to a required thickness, for example, one-half inch. By leaving the original oils, resins, or dirt on the glass fabric caused by weaving and by using a low content of binding resin, such as 25% of resin to 75% by weight of glass fabric a structure is provided in which the layers 2c separate from each other, or delaminate, with a force absorbing action upon being struck with a projectile. Typical binder resins are known polyester and phenolic resins.

Laying the warp cords 2b straight as described increases their force absorbing action and their delaminating action when struck by a projectile. This action is shown in FIG. 4. The projectile 7, somewhat more shattered or flattened, has penetrated farther into the laminate. The conical plug 6 has moved against the substrata 2 to deflect it downwardly over a relatively large area. This causes delamination of the reinforcing layers in regions 14, and breakage at 15 of some of the reinforcing layers 2a of glass fabric. The result is a high force absorbing and smothering action upon the projectile providing the protection desired.

The flexible bonding agent 4 is preferably an elastomeric material which is polymerizable at room temperature and containing 100% solids when in liquid form, for example, a polysulphide or silicone rubber adhesive.

Therefore, the principles of the invention are two fold:
(1) To blunt and shatter oncoming projectiles by the hard and brittle alumina ceramic facings.
(2) To dissipate the kinetic energy of the projectile by low conductivity, high heat ablation, delamination, elasticity, and impact resistance in the reinforced plastic substrata layer.

These actions are achieved both against solid steel core projectiles and against shaped charged projectiles. In the case of the steel core projectiles the core appears usually to fracture and/or melt even disappearing in part due apparently to gasifying. In the case of shaped charge projectiles and discharged gas to dissipate over and around the cone and delaminate over a large area to largely lose its effectiveness. The ablative properties of the ceramic and the plastic are though to cause them to char and to set up cool gaseous boundary layers to prevent the hot gases of a shaped charge from burning through, much like a plastic sheet is more difficult to cut with an oxyacetylene torch than a steel sheet.

The embodiment of the invention illustrated in FIGS. 1, 2, 4, and 5 produce opaque armorplate. FIG. 3 illustrates a transparent armorplate, indicated generally by the numeral 10 and comprising an outer layer 11 secured to a substrata layer 12 by a flexible bonding layer 13. In exhaustive testing it was found that plain window glass of between ⅛ inch to ⅜ inch thickness provides a hard surface layer 11 approaching the results of the alumina ceramic tile in the already described embodiment of the invention. The substrata layer 12 is a clear plastic material, for example, stretched methyl methacrylate, having a high degree of toughness. Tests were also conducted on full tempered glass plate, ¼ inch thick, and it was found that the tempered glass, although perhaps harder than the common window glass, tended to shatter so much more than the window glass that it completely obliterated vision through the armored plate, whereas the common window glass tended to shatter only around a small portion of the periphery of the impact area.

The adhesive layer 13 must also be transparent and is usually a methyl methacrylate cement.

The invention has been shown as having a continuous layer 11, but instead of the continuous layer a plurality of separate tile-like blocks of the glass may be utilized and this is particularly desirable when employing tempered plate glass to better localize shattering.

The transparent armorplate of the invention is not as effective as the opaque and must normally be made thicker, but has the transparent feature which is sometimes a requisite.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. Armorplate including a relatively thick base of transparent stretched methyl methacrylate, a relatively thick facing layer of transparent window glass on the base, and a relatively thin layer of methyl methacrylate cement securing the facing layer to the base.

2. Armorplate including a relatively thick base of transparent stretched methyl methacrylate, a relatively thick facing layer of transparent heat-tempered tiles of plate glass on the base, and a relatively thin layer of methyl methacrylate cement securing the facing layer to the base.

3. Armorplate including a base of transparent plastic material having a high degree of toughness, low thermal conductivity, and high heat of ablation characteristics, a facing layer of transparent glass on the base, and a flexible adhesive bonding layer securing the glass to the base, which is further characterized by the glass having a thickness of at least about ⅜", and the base layer having a thickness approximately equal to the thickness of the facing layer.

References Cited
UNITED STATES PATENTS

| | | | |
|---|---|---|---|
| 2,723,214 | 11/1955 | Meyer | 161—404 X |
| 2,991,209 | 7/1961 | Worrall | 161—404 X |
| 3,324,768 | 6/1967 | Eichelberger | 109—80 U X |
| 3,009,845 | 11/1961 | Wiser | 161—404 U X |
| 2,778,761 | 1/1957 | Frieder et al. | 161—404 X |
| 1,423,652 | 7/1922 | Edmonson | 109—84 |

PHILIP DIER, Primary Examiner

U.S. Cl. X.R.
89—36; 109—80; 161—203, 404